(12) United States Patent
Johnson et al.

(10) Patent No.: US 6,976,485 B2
(45) Date of Patent: *Dec. 20, 2005

(54) BARBECUE GRILL AND SUPPORT FRAME ASSEMBLY

(75) Inventors: Mark Johnson, Cary, IL (US); Adrian A. Bruno, Rolling Meadows, IL (US); Robert DeMars, Woodland Hills, CA (US)

(73) Assignee: Weber-Stephen Products Co., Palatine, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/098,721

(22) Filed: Apr. 4, 2005

(65) Prior Publication Data

US 2005/0166767 A1   Aug. 4, 2005

Related U.S. Application Data

(63) Continuation of application No. 10/319,421, filed on Dec. 13, 2002, now Pat. No. 6,910,476.

(51) Int. Cl.$^7$ .............................................. F24C 3/08
(52) U.S. Cl. ..................... 126/41 R; 126/40; 126/39 R
(58) Field of Search .......................... 126/41 R, 39 B, 126/50, 40, 39 R, 9 B

(56) References Cited

U.S. PATENT DOCUMENTS

| | | |
|---|---|---|
| 948,717 A | 2/1910 | Avery |
| 1,139,212 A | 5/1915 | Morgan |
| 1,302,911 A | 5/1919 | Gilbert |
| 1,438,345 A | 12/1922 | Tait et al. |
| 1,478,371 A | 12/1923 | Albrighton |
| 1,483,159 A | 2/1924 | Coleman |
| 1,531,405 A | 3/1925 | Lehman |
| 1,654,330 A | 12/1927 | Jenkins |
| D91,639 S | 2/1934 | Stulik |
| 1,952,776 A | 3/1934 | Quinlin |
| 2,021,915 A | 11/1935 | Hancook et al. |
| 2,154,305 A | 4/1939 | Goerl |
| 2,246,440 A | 6/1941 | Hester |
| 2,484,239 A | 10/1949 | Moon et al. |
| 2,559,710 A | 7/1951 | Danielson |
| 2,742,892 A | 4/1956 | Herzer |
| 2,791,959 A | 5/1957 | Pirz |
| 2,985,164 A | 5/1961 | Imoto |
| 3,005,451 A | 10/1961 | Richart |
| 3,094,113 A | 6/1963 | Avila |
| 3,330,266 A | 7/1967 | Stephen |
| 3,459,171 A | 8/1969 | Swanson |
| 3,611,912 A | 10/1971 | Chor |
| 3,665,913 A | 5/1972 | Cagle, Jr. |
| D229,660 S | 12/1973 | Gammon |
| 3,791,368 A | 2/1974 | Hunt et al. |

(Continued)

*Primary Examiner*—Alfred Basichas
(74) *Attorney, Agent, or Firm*—Dan M. DeLa Rosa

(57) ABSTRACT

The present invention provides a barbecue grill assembly with a grill body having a firebox and a cover and a burner element. The firebox is supported on a frame structure having a first frame member assembly and a second frame member assembly. The frame assemblies are secured together by combination of at least one cross member secured to the upper portion and being secured to the firebox at a lower region, without the need for additional cross members at the lower region. The invention further provides a frame with pivoting shelves secured to the frame, adapted to move from a use position to a storage position within the grill cooking chamber. The present invention further provides a frame assembly having a lateral slot for receiving and supporting a heat shield positioned below the firebox.

25 Claims, 9 Drawing Sheets

U.S. PATENT DOCUMENTS

| | | |
|---|---|---|
| 3,791,370 A | 2/1974 | Fauser |
| 3,915,529 A | 10/1975 | Bernier |
| D251,893 S | 5/1979 | Chan |
| 4,170,173 A | 10/1979 | Bradford |
| D285,522 S | 9/1986 | Basini |
| 4,616,624 A | 10/1986 | Parker |
| 4,677,964 A | 7/1987 | Lohmeyer et al. |
| D291,399 S | 8/1987 | Chan |
| 5,076,256 A | 12/1991 | Raymer et al. |
| 5,090,398 A | 2/1992 | Raymer et al. |
| D325,318 S | 4/1992 | Parent et al. |
| 5,109,834 A | 5/1992 | Collins et al. |
| 5,293,859 A | 3/1994 | Lisker |
| 5,359,988 A | 11/1994 | Hait |
| 5,452,707 A | 9/1995 | Harris et al. |
| 5,471,916 A | 12/1995 | Bird et al. |
| 5,617,779 A | 4/1997 | Dutczak |
| 5,623,866 A * | 4/1997 | Home .................. 99/444 |
| 5,832,915 A | 11/1998 | Skidmore et al. |
| 5,873,355 A | 2/1999 | Schlosser et al. |
| 5,941,229 A | 8/1999 | Schlosser et al. |
| 5,960,788 A | 10/1999 | Bach et al. |
| 5,970,971 A | 10/1999 | Wu |
| 6,131,562 A | 10/2000 | Schlosser et al. |
| 6,142,140 A | 11/2000 | Shumaker |
| 6,254,160 B1 | 7/2001 | Marriott et al. |
| 6,302,097 B1 | 10/2001 | Rivera |
| 6,308,616 B1 | 10/2001 | Johnson |
| D450,524 S | 11/2001 | Measom |
| D457,030 S | 5/2002 | DeMars |
| D457,776 S | 5/2002 | DeMars |
| D458,506 S | 6/2002 | DeMars |
| 6,439,220 B1 | 8/2002 | Johnson |
| 6,606,987 B2 | 8/2003 | DeMars |
| D503,586 S * | 4/2005 | Johnson ................. D7/402 |
| D503,587 S * | 4/2005 | Johnson et al. .......... D7/402 |
| 6,910,476 B2 * | 6/2005 | Johnson et al. ......... 126/41 R |
| 2004/0112361 A1 * | 6/2004 | Zelek et al. ........... 126/25 R |

* cited by examiner

BARBECUE GRILL AND SUPPORT FRAME ASSEMBLY

RELATED APPLICATION

This application is a continuation of U.S. application Ser. No. 10/319,421, entitled "Barbecue Grill and Support Assembly" which was filed on Dec. 13, 2002 now U.S. Pat. No. 6,910,476 and has now been given a Notice of Allowance.

CROSS-REFERENCE TO RELATED APPLICATIONS

Not Applicable.

FEDERALLY SPONSORED RESEARCH OR DEVELOPMENT

Not Applicable.

TECHNICAL FIELD

The present invention relates to a barbecue grill and frame assembly. More specifically, the present invention relates to a compact portable barbecue grill cooking chamber with a frame assembly supporting the cooking chamber.

BACKGROUND OF THE INVENTION

Barbecue grills have grown in popularity in recent years. There are two primary types of barbecue grills commonly used: gas grills and solid fuel grills. Gas barbecue grills employ a gas burner or group of burners to cook food that is supported on a grate above the burner(s). The fuel source for gas barbecue grills is typically liquid propane or natural gas. Solid fuel barbecue grills use combustible solid fuel, typically charcoal, to cook the food. As a result, this type of grill is commonly referred to as a charcoal barbecue grill. Regardless of the type, the barbecue grill has a cooking chamber that includes a cover and a firebox. By movement of the cover, the cooking chamber is movable between an open position and a closed position. The cooking chamber may be in the closed position when the food is being cooked by the barbecue grill. Preferably, the cover is in the closed position when the grill is not in use, and instead is stored between uses.

During operation of the barbecue grill, food is placed on the grate for cooking, which results in grease and such byproducts from the food being released during cooking. The quantity of grease generated during the cooking process varies with a number of factors, including but not limited to the type of food cooked, the amount of food cooked, the amount of heat generated by the heat source such as a burner tube, and the ambient conditions. Over time and repeated use, grease and byproducts can accumulate within the cooking chamber. The accumulation of grease and byproducts can negatively affect the performance and operation of the barbecue grill assembly. For this reason, some barbecue grills incorporate an opening in the bottom of the lower portion of the cooking chamber for passage and collection of grease and/or debris.

Another aspect of conventional barbecue grills is to provide a frame or support structure to hold the cooking chamber in suitable location for use. Also, some commonly used grills include side work shelves, to provide area for resting food and utensils when using the grill. The support frame structures often serve as support for the side shelves, and sometimes provided as collapsible shelves. In typical grill assemblies, the collapsible side shelves typically drop to a storage position toward the frame structure, usually into a generally vertical non-use position.

One example of such a common gas barbecue grill is shown in U.S. Pat. No. 4,677,964 to Lohmeyer et al. In FIG. 4, the cooking chamber 52 comprises the cover 58 and the firebox 56. A burner element 62 is positioned in a lower region of the firebox 56 and a grate 66 is positioned in an upper region of the firebox 56. A drip pan 98 collects grease and byproducts that pass through the drain opening in the lower portion of the firebox 56. The cover 58 is movably supported by a hinge 60 positioned at the rear of the cooking chamber 52. A rim defines a perimeter of the of the firebox 56. In the closed position of FIG. 4, the rim engages the angled front wall of the cover 58. The grill assembly also has a portable cart 22 that supports the lower housing 52 of the grill, as it is suspended on the side members 40 of the cart 22. The grill assembly further provides a working surface, such as a working board 170 supported on the side members of the cart 22, adjacent the cooking vessel 24. In a collapsible arrangement of the working board 172, the board is connected to the cart 22 by a hinge, and is supported by a rod 174.

Despite the popularity of grill and supporting cart or frame assemblies in use, there is a need for a barbecue grill and frame structure with compact arrangement and versatility of side shelves that pivot on the frame into the cooking chamber for storage of the grill. Further, there is a need for a grill and support frame structure that supports a heat shield and grease/debris collection chamber and serves to support a lower shield below the cooking chamber. The present invention is provided to resolve these and other needs.

SUMMARY OF THE INVENTION

It is an object of the present invention to provides a barbecue grill assembly with a grill body having a firebox and a cover and a burner element. The firebox is supported on a frame structure having a first frame member assembly and a second frame member assembly. The frame assemblies are secured together by combination of at least one cross member secured to the upper portion and being secured to the firebox at a lower region, without the need for additional cross members at the lower region. It is also an object of the present invention to provide a frame with pivoting shelves secured to the frame, adapted to move from a use position to a storage position within the grill cooking chamber. And it is an object of the present invention to provide a frame assembly having a lateral slot for receiving and supporting a heat shield positioned below the firebox.

Other features and advantages of the invention will be apparent from the following specification taken in conjunction with the following drawings.

DETAILED DESCRIPTION OF THE INVENTION

Figure 1:
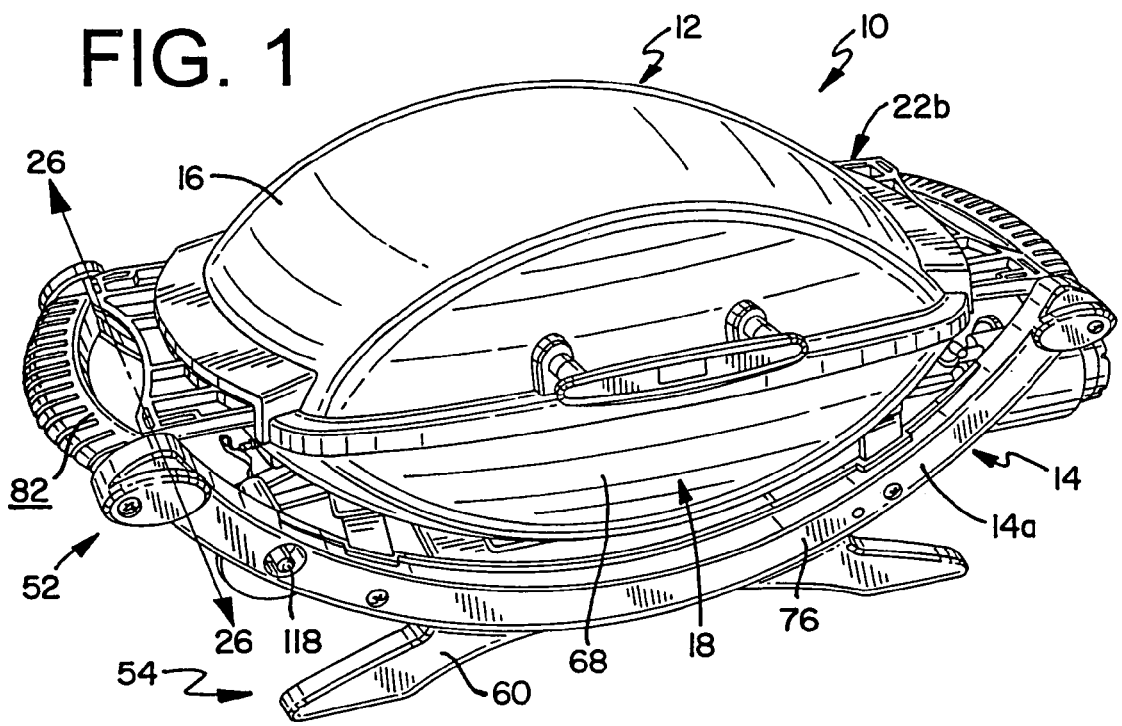
FIG. 1 is a perspective view of a barbecue grill assembly according to the present invention, showing a frame structure and a cooking chamber in closed position.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Figure 8:
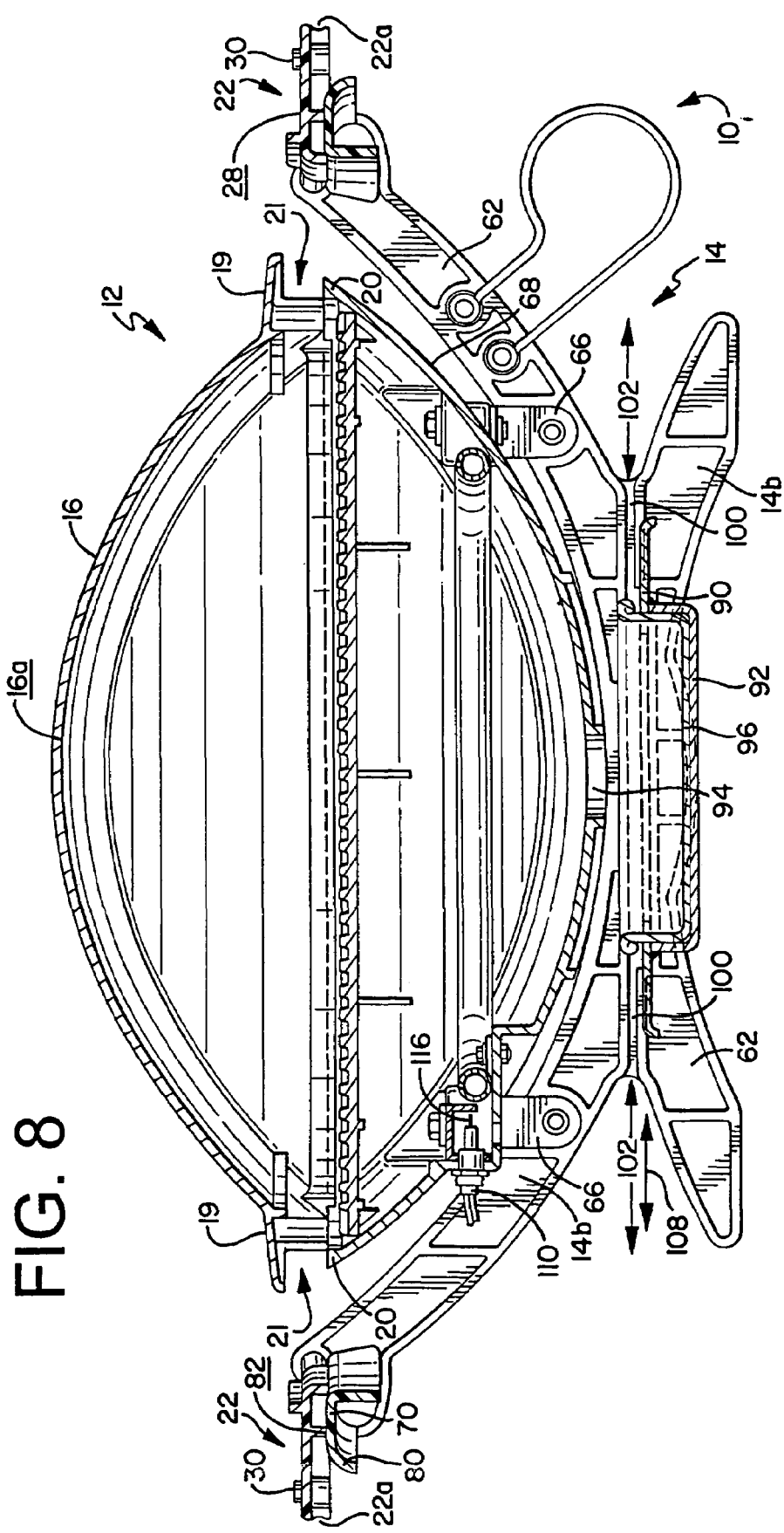
FIG. 8 is a partial view of the grill shown in FIG. 3, taken along section lines 8—8 of FIG. 3.

The present invention provides a barbecue grill assembly 10, as is shown in the Figures in the preferred form of the invention. The barbecue grill assembly 10 generally includes a cooking chamber 12 and a support frame assembly 14. The support frame assembly 14 is adapted to provide support to the cooking chamber 12 and has a front structure 14a and a rear structure 14b. The cooking chamber 12 includes a cover 16 that is preferably connected to a firebox 18 by a hinge mechanism 17. The cover 16 has a lower edge 19 that is dimensioned to substantially mate with an upper edge 20 of the firebox. The mating of the cover lower edge 19 and the firebox upper edge 20 occurs when the cover 16 is placed over the firebox 18 such that the cooking chamber 12 is in a closed arrangement. In this manner, the upper edge 19 is in alignment with the lower edge 20, even though there are preferably areas of the cooking chamber that provide an opening or a space 21 between the cover 16 edge 19 and the firebox 18 edge 20 (see FIGS. 8, 9, and 10). Such openings 21 between the cover 16 and the firebox 18 are provided for passage of side shelves 22 into the cooking chamber 12 for the shelf or shelves 22 to be placed into a non-use or storage configuration, such as is shown in FIGS. 1, 2 and 11 through 13.

A grate 24 is removably positioned generally within the firebox 18. The grate 24 defines a cooking surface upon which food is placed during operation of the grill assembly 10. In a preferred embodiment, at least one side shelf 22 resides above and adjacent the grate 24 when the shelf 22 is in the storage configuration. In the embodiment shown in the Figures, at least one shelf 22 is secured to a portion of the frame assembly 14 along a hinge line 26. Rotation, or pivoting, of the shelf 22 along the hinge line 26 provides selected movement of the shelf 22 from a first position 22a in which the shelf 22 resides adjacent the firebox 18 and in spaced relationship from the firebox 18. When the shelf 22 is in the first position 22a, at least a portion of the shelf 22 provides a work surface 28 of the shelf exposed for use during cooking. In the shelf arrangement of 22a, the shelf 22 extends generally horizontally adjacent the cooking chamber 12, thereby providing a generally horizontal platform of the work surface 28.

Figure 2:
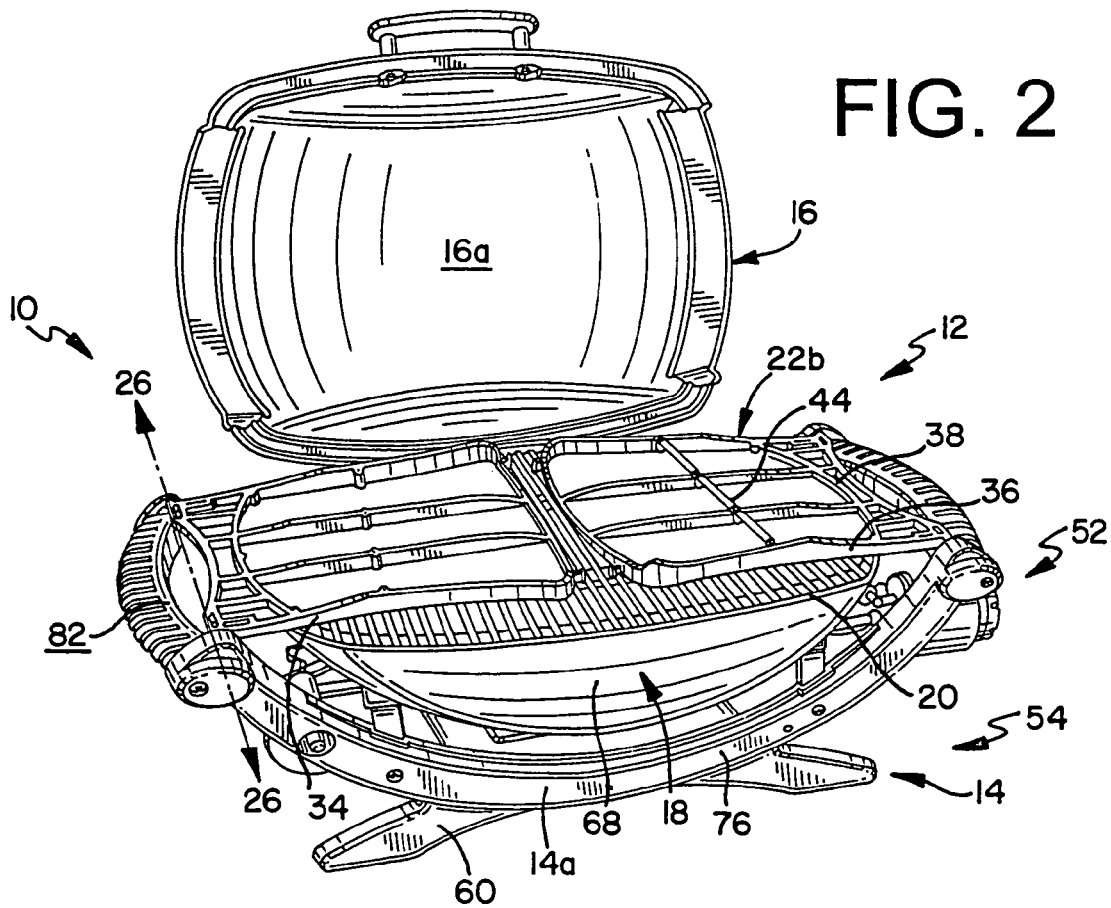
FIG. 2 is a perspective view of the grill assembly of FIG. 1 showing the cooking chamber in an open position and collapsible shelves in non-use position.
Figure 3:
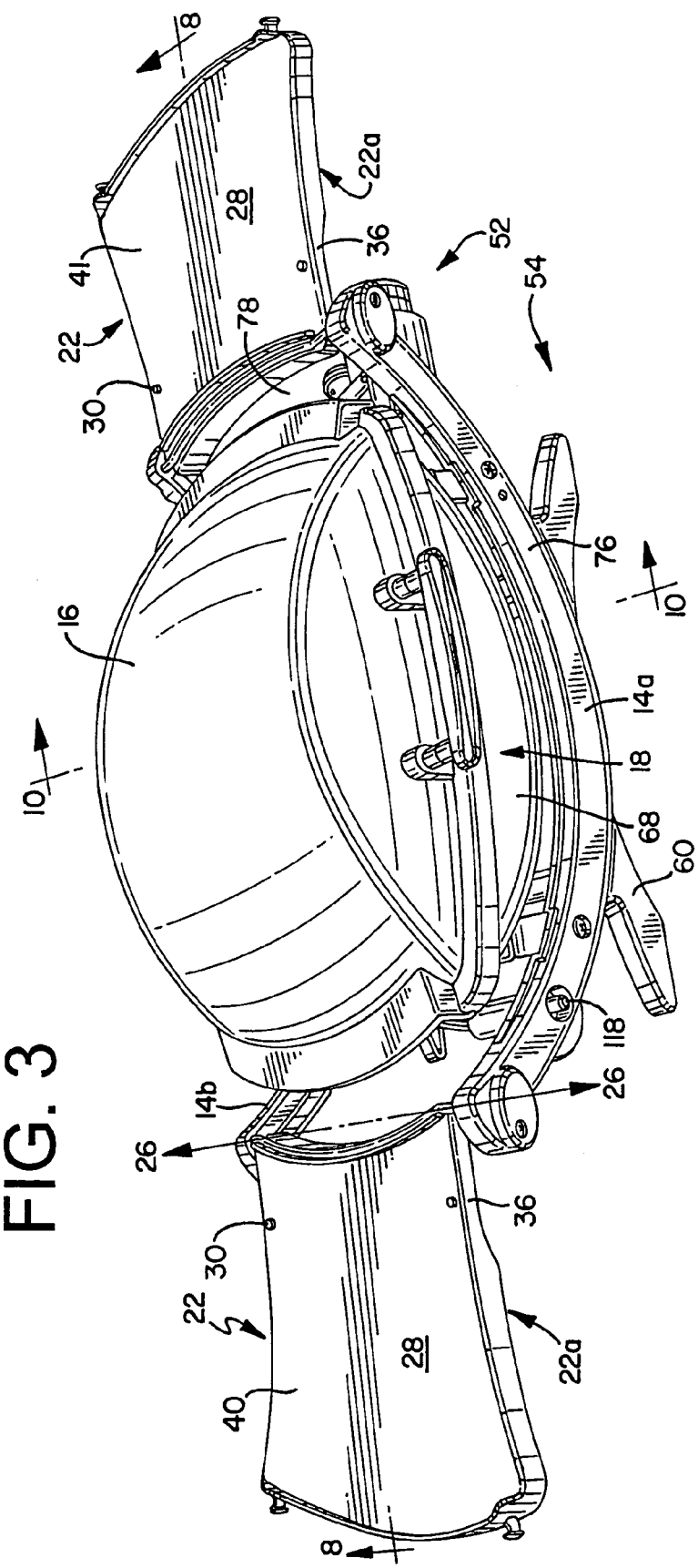
FIG. 3 is a perspective view of the grill assembly of FIG. 1 showing the cooking chamber in a closed position and the collapsible shelves in an extended, or use, position.
Figure 4:
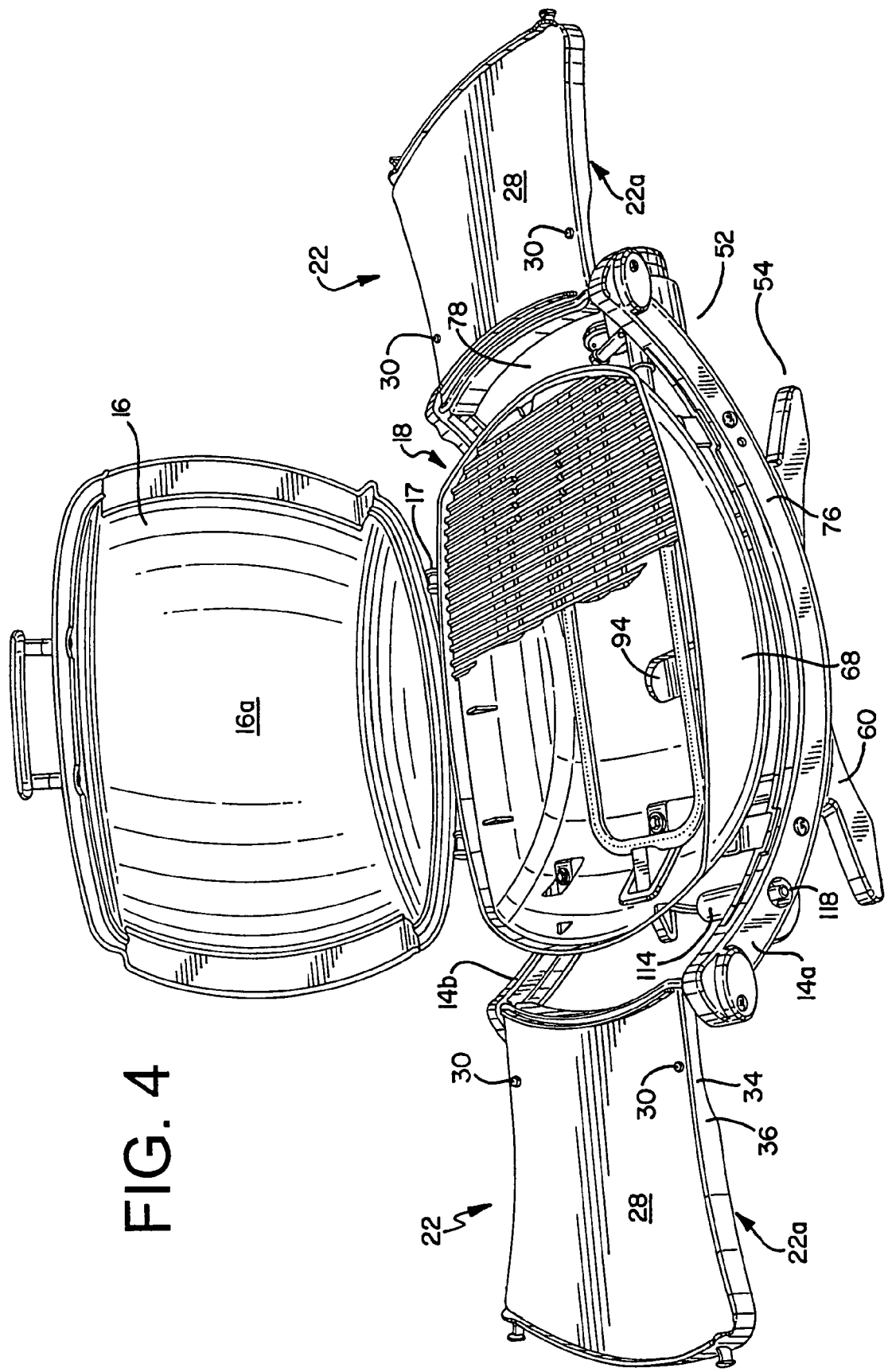
FIG. 4 is a perspective view of the grill assembly of FIG. 3 showing the cooking chamber in an open position and the shelves in a use position, with a partial section view of the grate shown to provide a view of the inner portion of the bottom of the cooking chamber.
Figure 5:
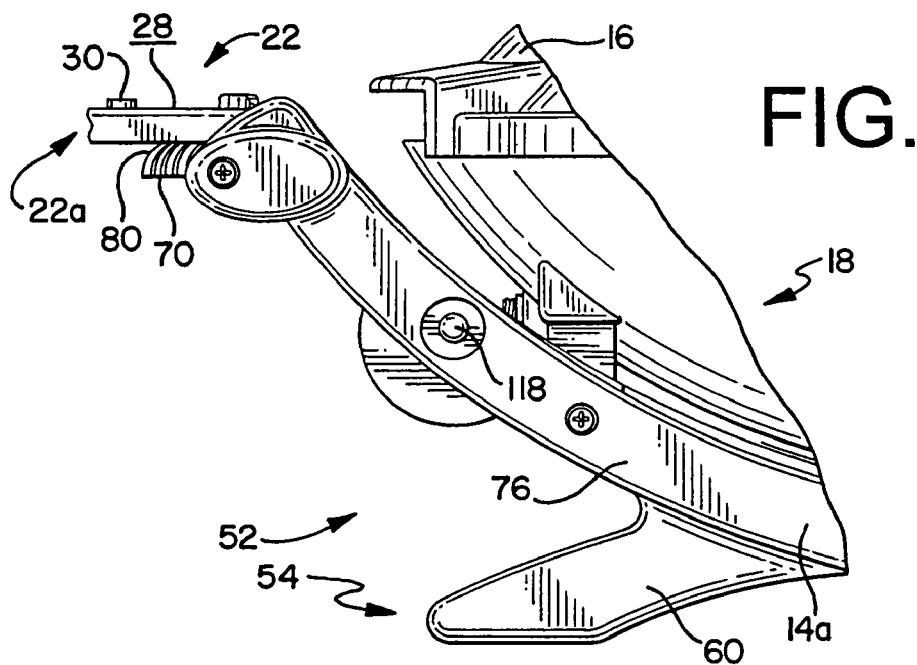
FIG. 5 is a front view of a portion of the grill shown in FIG. 3, showing the left side of the grill and frame assembly, and a portion of the collapsible shelf in the use position.
Figure 6:
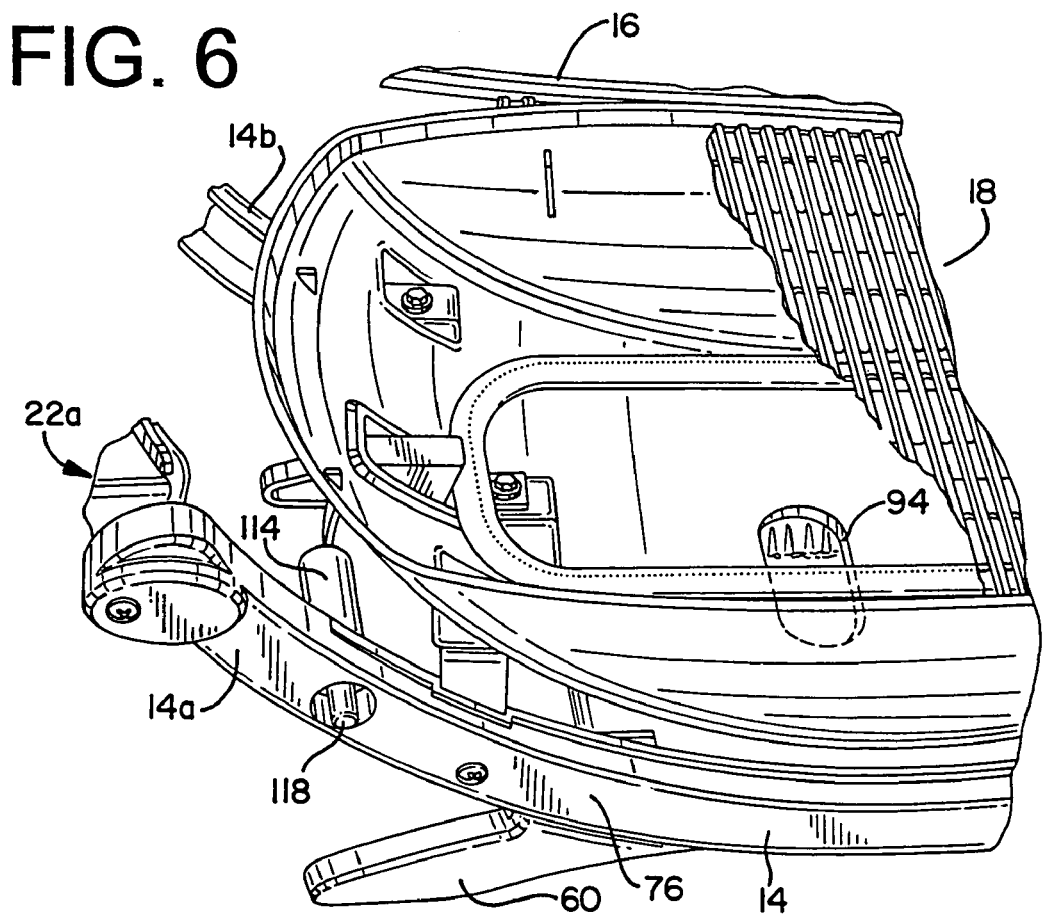
FIG. 6 is an enlarged view of a portion of the grill assembly shown in FIG. 4, showing the grill grate in partial section view to provide a view of a portion of the bottom area of the cooking chamber and the opening in the bottom of the cooking chamber.

When the shelf is moved to the storage arrangement 22b, the shelf is pivoted about the hinge line 26, such that the work surface 28 is positioned facing the grate 24 within the cooking chamber 12. As shown in FIG. 2, the shelf 22 in the second position 22b thereby has at least a portion of the shelf 22 within the cooking chamber 12, supported within the chamber 12 above the grate 24. In this manner, the shelf 22 passes from the hinge line 26 adjacent and outside the firebox 18, through the opening 21 between the cover 16 and the firebox 18, to partially reside within the chamber 12 above the grate 24. In a preferred embodiment, the shelf 22 is adapted to provide contact with the cooking chamber 12 such that the shelf 22 is supported by the cooking chamber at the contact. In the embodiment shown in the figures, the contact structure of the shelf 22 includes a projecting surface from the shelf 22, such as at least one boss 30 of the shelf 22. The boss 30 is adapted to provide supporting contact 32 (FIG. 12) for the shelf 22 to be supported on a portion of the cooking chamber 12, and preferably at the upper edge 20 of the firebox 18. In the embodiment shown in the figures, the shelf 22 is formed of plastic or the like, and the boss 30 is a heat resistant material, such as a metal pin or grommet boss 30. Also, in a preferred embodiment, the boss 30 extends outward from the work surface 28 of the shelf 22 to provide the supporting contact 32 in spaced relationship from the firebox 18, thereby assuring that the shelf 22 does not make contact directly with the cooking chamber 12 when in the second position 22b.

The shelf 22 is supported primarily by the connection of the shelf 22 to the frame assembly 14 along hinge line 26, wherein the support is provided as a cantilever support of the shelf 22 in the first position 22a. In the embodiment shown in the figures, the shelf 22 is freely movable in rotation about the hinge line 26 from the first position 22a to the second position 22b, without being locked in either location. However, it is contemplated that the assembly 10 may also include a locking member (not shown) for the shelf 22 to be releasably secured in the first position 22a and/or the second position 22b.

In the embodiment shown in the figures, the shelf 22 is at least partially secured in the second position 22b by being trapped between the firebox 18 and the cover 14. In this embodiment, the shelf has a thickness 34 having an extent that substantially mates with the opening 21 for the shelf 22 to pass into the cooking chamber 18. The thickness 34 of the shelf shown in the figures includes the combination of the work surface 28, side edges 36 and at least one strengthening rib 38 or ridge positioned on the bottom surface 39 of the shelf 22 (see FIG. 11). In this arrangement of cooperative structure combining to form the thickness 34 to substantially cover the opening 21, the ridge 38 is adapted to block water or the like from entering the cooking chamber along the surface 39 of the shelf 22, even though adjacent areas of the surface 39 comprise a recess or compartment such as when the shelf is made with thinner material and the strengthening ridges 38 reside on the surface 39 to provide strength or beam-strength rigidity of the shelf 22.

Figure 12:
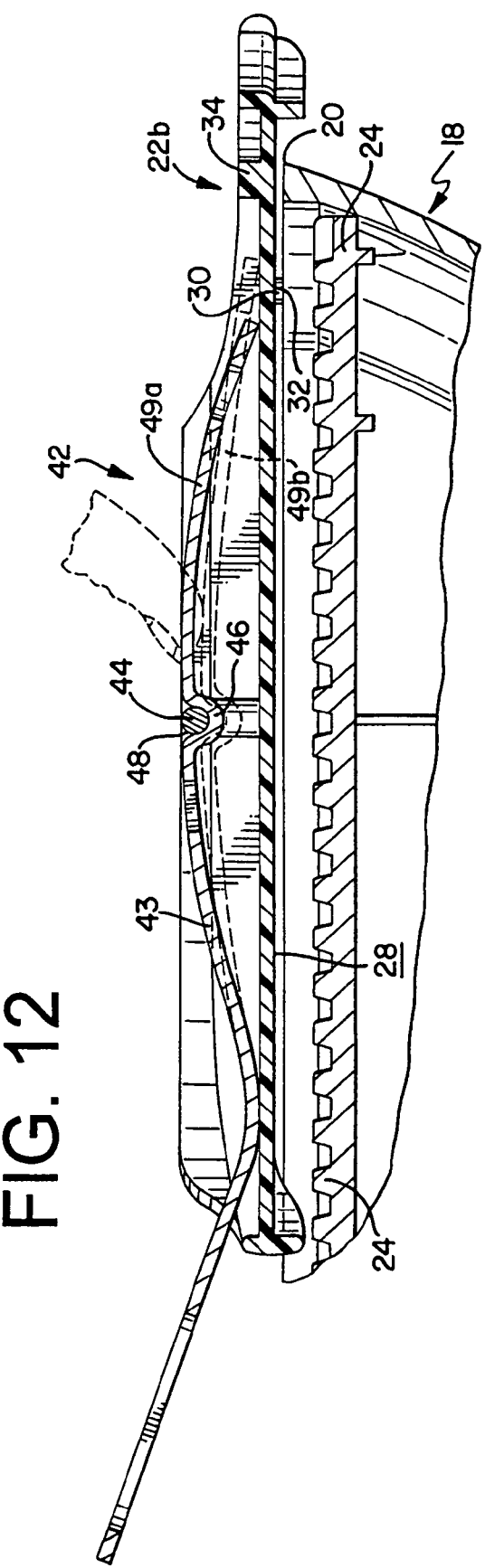
FIG. 12 is a cross sectional view of a portion of the grill assembly structure taken along 12—12 of FIG. 11.

In the preferred embodiment, the assembly 12 includes two shelves 22, a first shelf 40 and a second shelf 41. The first shelf 40 is located on one side of the cooking chamber 12 and the second shelf 41 is located on a generally opposed side of the cooking chamber 12. In this arrangement, the two shelves 40, 41 each are rotatable about independent hinge lines 26 to move the shelves 40, 41 into the cooking chamber area such that both shelves together fit in to shelf storage positions 22b above the grate 24. Further, at least one shelf 22 includes a utensil mounting assembly 42, preferably located on the bottom surface 39 of the shelf 22. The mounting assembly 42 is adapted to hold cooking utensils 43 on the shelf 22 for storage of the utensils 43, by a locking component 44 adapted to provide frictional engagement of the utensil 43 to be removably secured, such as by the user pushing down on a portion of the utensil (see FIG. 12). Engagement of the utensil 43 to the locking component 44 preferably includes mating of a recess 46 and a projection 48. In the embodiment shown, the recess 46 is positioned on the utensil 43 and the projection 48 is located on the locking component 44. However, the location of the mating recess 46 and projection 48 may be in reversed arrangement on the structures. In the arrangement of the recess 46 and projection 48, the user removes the utensil 43 by pushing at least a portion of the utensil 43 from a first position 49a wherein the projection 48 is within the receiver 46 to a second position 49b wherein the projection 48 is not within the receiver 46 and the utensil 43 may thereby be removed (FIG. 12).

Figure 7:
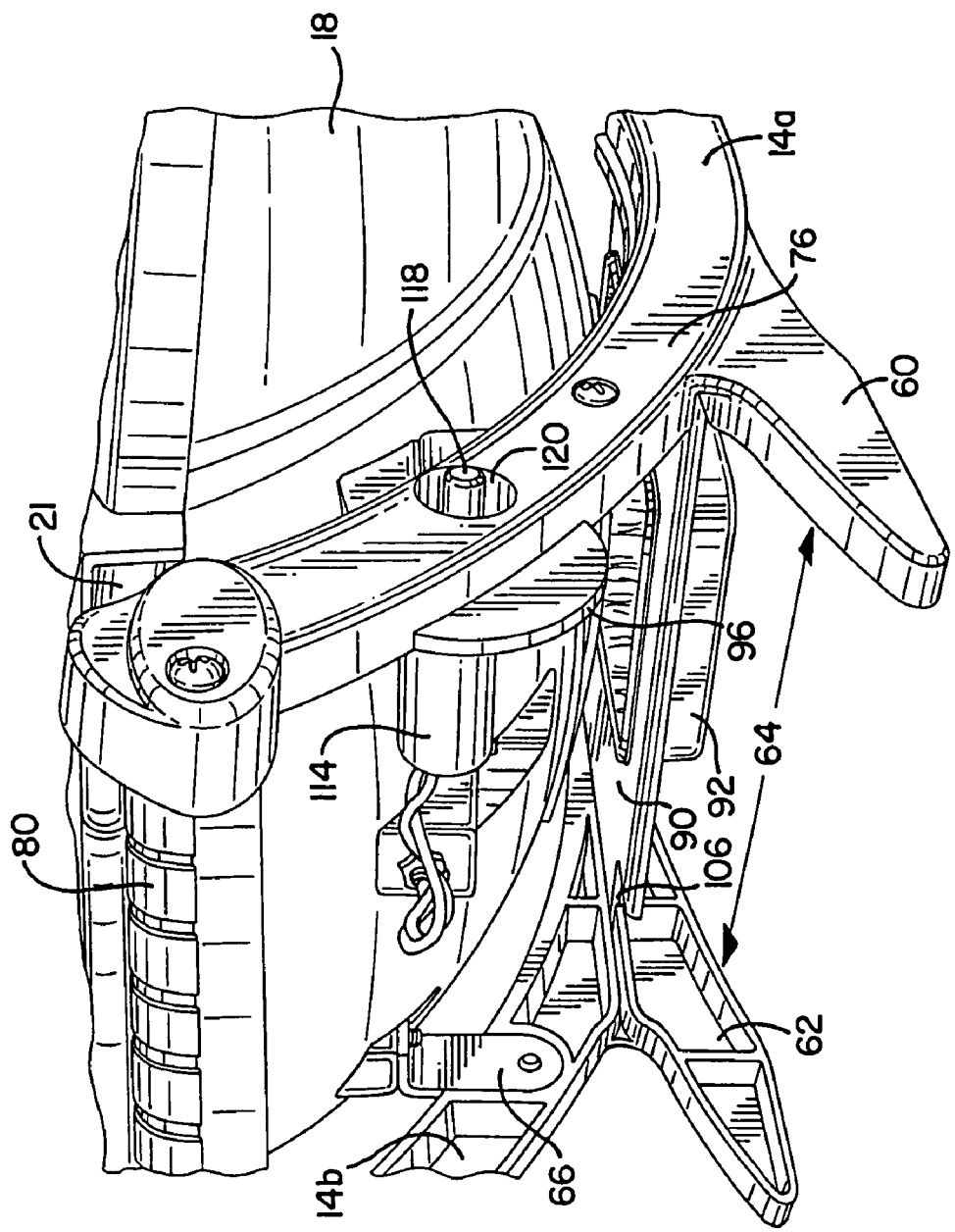
FIG. 7 is a partial side perspective view of the grill assembly shown in FIG. 1, showing detail of the mounting of a frame member to the cooking chamber, and showing detail of the grease collection tray in the frame assembly.
Figure 10:
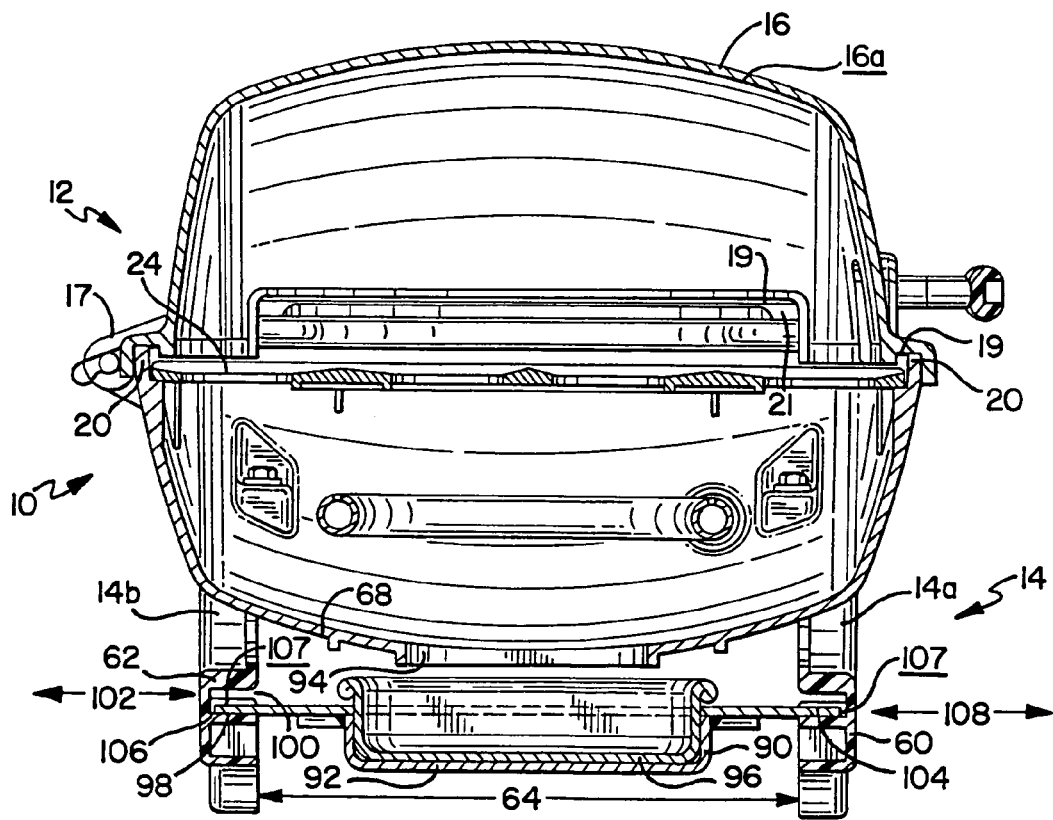
FIG. 10 is a cross sectional view of the grill along 10—10 of FIG. 3.
Figure 11:
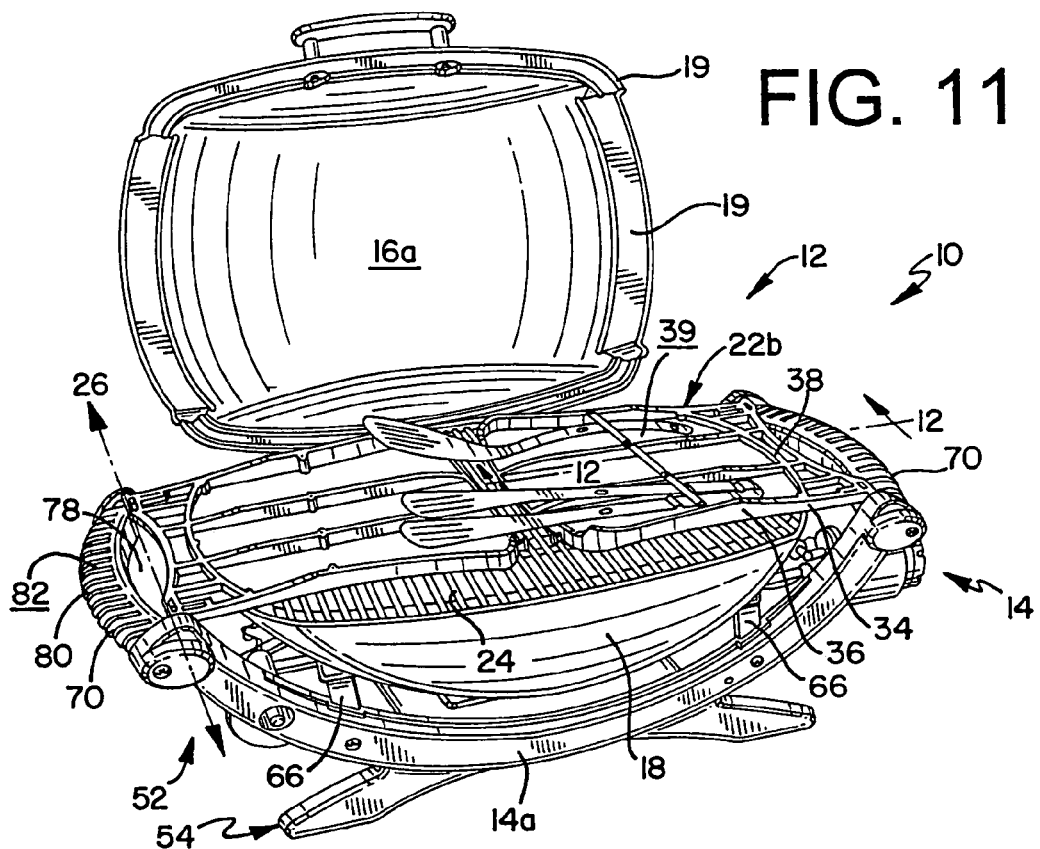
FIG. 11 is the grill assembly of FIG. 2 with the addition of showing cooking utensils secured to one of the shelves.
Figure 13:
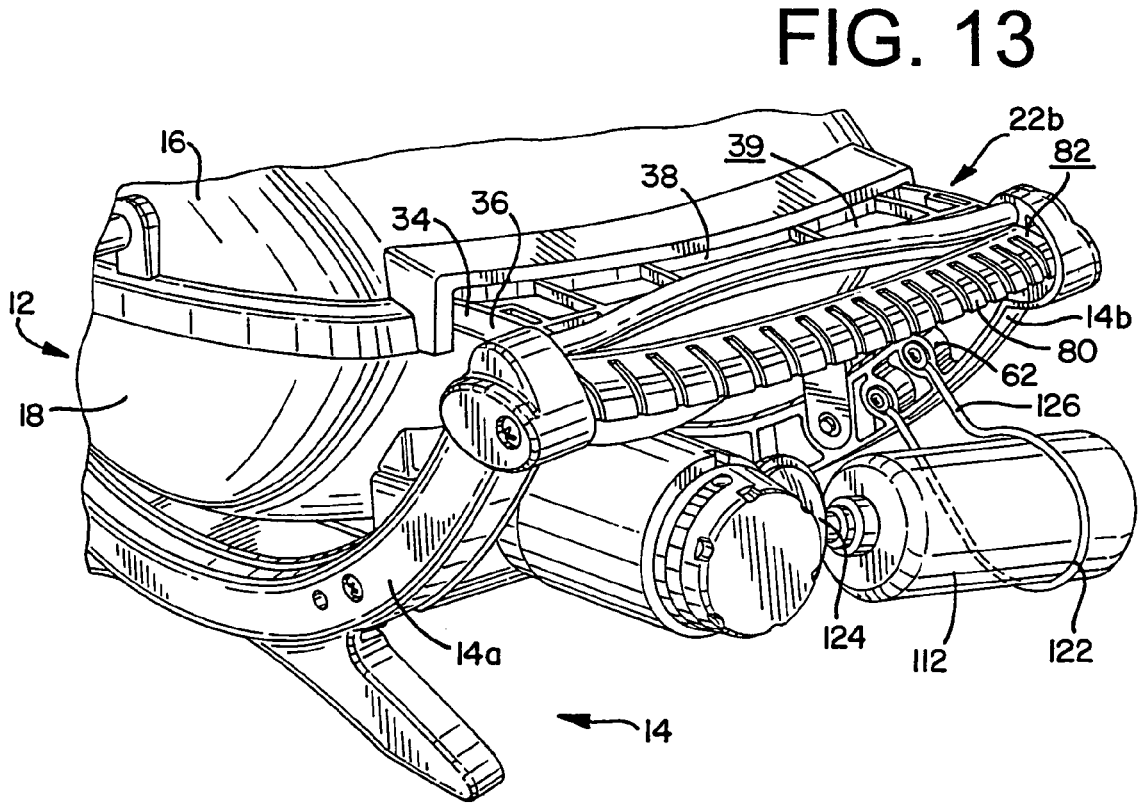
FIG. 13 is an elevated perspective view of part of a side of the grill assembly of FIG. 1, showing attachment of a gas tank as a fuel supply, with the gas tank being in the secured position with the grill assembly.

The frame assembly 14 is made up of a plurality of frame members. The frame members are preferably each of preformed construction having an upper portion 52 and a lower portion 54. In the preferred embodiment, the frame assembly 12 is comprised of at least two frame members assemblies, a first frame member 60 and a second frame member 62. The first and second frame members 60, 62 are secured in position for supporting the cooking chamber 12 by being mounted to the chamber 12 in spaced relationship, having an extent of space 64 between the frame members 60, 62 (FIGS. 7 and 10). The frame members 60, 62 are secured at the spaced extent 64 by securement of the frame members 60, 62 to the firebox by at least one mounting member 66 joining the frame members 60, 62 to the firebox 18 of the cooking chamber 12. In the embodiment shown in the Figures, the mounting member 66 includes a plurality of tabs (FIG. 8) extending from the firebox 18 outer wall 68, at the underside and bottom portion of the firebox 18. The mounting members 66 thereby cooperatively mate with surfaces of the frame members 60, 62 and a fastened to the frame to secure the frame assembly 14 adjacent, and in spaced relation to, the firebox 18. In the grill shown, the mounting of the frame to the firebox 18 in this manner serves to secure the lower portion of the frame members 60, 62 in position without the need for lateral cross members between the frame members 60, 62 beneath the fastening at the mounting members 66.

The frame assembly 14 also includes at least one cross member assembly 70 positioned at the upper portion of the frame members 60, 62. The cross member 70 is adapted to provide an upper frame connection perimeter for further fixing the frame members 60, 62 in position—separated by an extent of space. Preferably, the connection perimeter includes two cross members 70, a first cross member 72 and a second cross member 74. The cross members 70 preferably each have one end connected to the first frame member 60, and an opposed end connected to the second frame member 62. The mounting members 66, as shown in the preferred form in he Figures, include elongated tabs of metal, the tabs are fastened to the firebox 18 and extend therefrom. The fastened tabs is especially useful to provide mounting for the frame 14 to the cooking chamber 12, where the firebox is constructed of metal, such as sheet metal or cast metal (aluminum), and the frame 14 is at least partially constructed of other material such as plastic. Since the outer wall of the firebox inevitably will get hot when using the grill, securing a separate tab for mounting the firebox 18 to the plastic frame 14 will provide a mounting assembly that reduces heat transfer to the frame 14.

In a preferred embodiment of the invention, the shelf 22 has a void area 78. The void area of the shelf 22 is located in the area between the hinge line 26 and the firebox 18 when the shelf 22 is in the first position 22a, thereby providing a gap or space between the shelf and the side of the firebox 18. This spacing of the shelf provides a distance for the shelf from the heat emitted at the side of the firebox, especially useful when the shelf is made of plastic. When the shelf 22 is placed in the second position 22b, the void area 78 exposes a portion of the cross member that thereby provides a handle 80 for the user to move the grill.

In yet another aspect of the preferred form of the invention, the frame 14 is formed of generally X-shaped frame members 60, 62. The upper portion of the frame members 60, 62 extend, radially upward and outward from a central body region 76, and the lower portion of the frame members 60, 62 extend radially outward and downward from the central body region 76. In this embodiment, mounting of the firebox 18 to the frame members 60, 62 by the mounting members 66 is located at the central body region 76 of the frame members 60, 62. The lower extending portion of the frame members 60, 62 thereby are adapted to serve as supporting legs of the grills assembly 10. The legs are preferably formed of a unified structure extending from the central body portion 76, adapted to extend with sufficient rigidity to support the cooking chamber 12 with legs in spaced relationship 64 without the need for cross members securing the legs together. In this preferred arrangement, the grill assembly frame 14 is formed solely from two frame assemblies joined by cross members at one portion of the frame 14, in cooperation with being joined to the firebox at another portion of the frame 14.

The upper cross member(s) 70 include a handle 80 with a gripping portion 80a. Because the cross member is secured between the frame members 60, 62, the cross member 70 is securely fastened such that a portion of the cross member itself may be adapted to provide the handle 80. This is shown in the Figures, as the cross member 70 includes a curved handle that is suitably dimensioned to provide a gripping portion 80a for a user to grasp and transport or lift the grill assembly 10. As is also shown, the preferred embodiment of this assembly 10 provides securement of the shelf 22 along the hinge line 26 immediately adjacent the cross member 70. The shelf 22 is thereby supported in the first position 22a by resting on at least a portion of the upper surface 82 of the cross member 70. In the preferred embodiment, the shelf 22 is supported in the first position 22a solely by the combination of the cantilever support at the hinge line 26 and contact of the shelf with the upper surface 82 of the cross member 70.

The grill assembly 10 also include a heat shield 90 mounted beneath the firebox 18 and attached to the frame 14. The heat shield 90 is preferably formed of an elongated pieces of metal sheet stock. The heat shield 90 also includes a collection chamber 92, preferably in a central area of the heat shield 90, for receiving drip of grease or debris from the firebox 18. The firebox 18 has an opening 94 to allow grease or debris from cooking to fall from within the firebox 18 toward the bottom of the assembly 10. The collection chamber preferably is adapted to receive a removable receptacle 96 that is positioned below he opening 94.

The combination heat shield 90 and collection chamber 92 is preferably secured into position to substantially span the extent of the space 64 between the frame members 60, 62. The heat shield 90 thereby acts as a barrier between the bottom of the firebox 18 and the area beneath the heat shield 90. This is especially useful for the grill configuration shown in the Figures, having a compact design with short leg portions of the frame 14, as is desirable for a table-top grill design. Also, when the grill assembly is attached to a cart structure (not shown), removal of the grill assembly 10 from such a structure will not disrupt the mounting of the heat shield 90 and collection chamber 92 from position beneath the firebox 18, as the heat shield 90 remains fixed in position by the frame 14.

Figure 9:
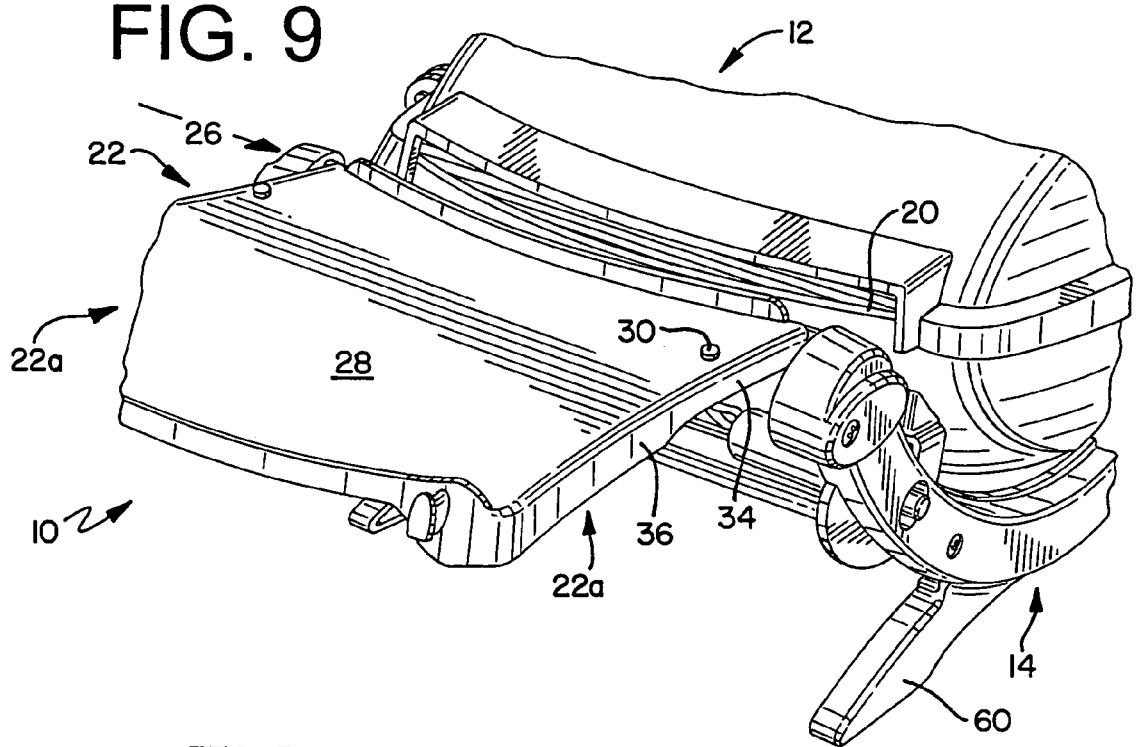
FIG. 9 is an elevated perspective view of a side of the grill shown in FIG. 3, showing the collapsible side shelf and frame assembly arrangement with the shelf in the use position and the cover in the closed position.

The heat shield 90 is secured in position on the frame by being supported on at least one lateral support surface 98 along an extent of the frame member (FIG. 10). In the preferred form of the invention, the lateral support surface 98 is comprised of a groove 100 formed in the first and second frame assemblies 60, 62. The grooves 100 cooperatively form a lateral slot along a lateral sliding path residing along a plane 102. The lateral slot is adapted to provide a path for the heat shield to pass into the space 64 between the frame assemblies 60, 62 to be inserted in place, with the bottom surfaces of the grooves 100 providing a sliding surface of edge areas 104 of the heat shield 90 (FIG. 9). At least one groove 100 further having a recess 106 with a lateral wall surface 107 adapted to prevent lateral movement of the shield 90 when the edge area 104 of the shield 90 is dropped from the lateral plane to a position on a lower plane 108 (FIG. 10). In this arrangement of structure, the shield 90 is inserted by the user between the frame members 60, 62 by insertion along the plane 102, and then lowered into plane 108 for the shield to be supported in the groove and prevented from lateral sliding removal by the wall surface 107.

The assembly 10 also includes an ignitor 110, used to ignite the burner element, which is preferably a gas burner such as is shown in the Figures, with a fuel source such as a fuel tank 112. The ignitor includes an ignitor actuator control 114 as a button or switch, which is secured to the frame assembly 14 to be mounted securely to the grill 10 and yet be exposed for the user to activate the ignitor distal end 116 which generates the spark or the like to ignite the gas from the burner for cooking. In the preferred form of the invention, the actuator 114 is located on one of the frame assemblies 60 and a portion of the actuator 114 passes through the frame assembly 60 to provide an exposed actuator button 118 on the frame 14 at a recess 120 in the frame 14.

A support bracket 122 is provided on the frame at the side of the firebox 18 for supporting the fuel tank 112. The support bracket 122 includes a loop having an inner perimeter that is cooperatively dimensioned to receive the outer perimeter of a standard and common size fuel tank 112. The fuel tank is thereby held in place on the grill assembly by the combination of the support bracket 122 at one part of the tank 112, and the tank being secured to the gas manifold 124 of the assembly 10. In the embodiment shown in FIG. 13, the support bracket 122 is mounted directly to the inside of a frame assembly 62, preferably the rear frame structure 14b. The mounting of the bracket 122 includes an attachment arm 126 that extends from the frame 14 to place the bracket perimeter in position for receiving the tank 112.

While the specific embodiments have been illustrated and described, numerous modifications come to mind without significantly departing from the spirit of the invention and the scope of protection is only limited by the scope of the accompanying claims.

We claim:

1. A portable barbecue grill assembly comprising:
   a grill body comprising at least one cooking chamber having at least one lower firebox, said firebox comprising a base and at least two sidewall;
   a frame assembly comprising at least two supporting frame members;
   at least one shelf being directly and pivotally attached to said frame assembly, at least a portion of said shelf being foldable into said cooking chamber during a stowage position and extendable from said cooking chamber during said usage position and having a distance between said shelf and said cooking chamber to avoid heat damage to said shelf when the cooking chamber is in use; and
   a mounting assembly comprising at least two mounting members being attached to said firebox, said first mounting member being directly connected to said first supporting frame member and said second mounting member being directly connected to said second supporting frame member to thereby create a distance between said cooking chamber and said frame assembly to avoid heat damage to said frame assembly when the cooking chamber is in use and said mounting assembly creating a fixed special relationship between said first and second frame members without the need of a cross member between said frame members.

2. The grill assembly of claim 1 wherein said mounting assembly comprises at least four mounting members, each of said frame members having opposing ends, at least one of said mounting members being attached to each one of said opposing ends of said frame members.

3. The grill assembly of claim 1 wherein at least one of said mounting members is attached to said base of said firebox.

4. The grill assembly of claim 1 wherein at least one of said mounting members is attached to at least one sidewall of said firebox.

5. The grill assembly of claim 1 wherein each of said frame members comprises at least one leg.

6. The grill assembly of claim 1 wherein each of said frame members having opposing ends, said grill assembly further comprising at least one handle, said handle being connected to at least one of each of the opposing ends of each of the frame members.

7. The grill assembly of claim 1 further comprising at least one removable collection chamber, said collection chamber being situated below said base of said firebox and being designed to capture grease and debris from said cooking chamber, said base of said firebox having at least one aperture situated above said collection chamber.

8. The grill assembly of claim 7 wherein said collection chamber further comprising at least one heat shield and there is a distance between said collection chamber and said base of said firebox.

9. The grill assembly of claim 7 wherein each of said frame members comprises at least one groove, said frame members being arranged so that said grooves are aligned on a parallel horizontal plane, said collection chamber being designed to be slideably attachable to and removable from said grooves, said grooves creating a distance between said collection chamber and said firebox to thereby avoid heat damage to said collection chamber when the cooking chamber is in use.

10. The grill assembly of claim 1 wherein said frame members are arch-shaped, each of said frame members having two opposing ends and a central section, each of said frame members having upper and lower portions, at least one of said opposing ends of said frame members being adjacent to said upper portion and said central section being adjacent to said lower portion of said frame members, said lower portion of said frame members being adjacent to said lower firebox.

11. The grill assembly of claim 1 wherein said base of said firebox is arch-shaped, said base having opposing ends, each of said sidewalls being connected to said opposing ends of said base.

12. A portable barbecue grill assembly comprising:
a grill body comprising at least one cooking chamber having at least one lower firebox, said firebox comprising at least two opposing sidewall and a base with at least one aperture;
a frame assembly comprising at least two supporting frame members, said frame assembly being attached to said firebox, each of said supporting frame members being attached adjacent to each of said opposing sidewalls of said firebox, each of said frame members having at least one collection chamber supporting member;
at least one shelf being directly and pivotally attached to said frame assembly, at least a portion of said shelf being foldable into said cooking chamber during a stowage position and extendable from said cooking chamber during said usage position and having a distance between said shelf and said cooking chamber to avoid heat damage to said shelf when the cooking chamber is in use; and
at least one collection chamber for collecting grease and debris from said cooking chamber, said collection chamber being located below said base of said firebox adjacent to said aperture, said collection chamber being designed to be slideably attachable to and removable from said collection chamber supporting member, said collection chamber supporting member creating a distance between said collection chamber and said firebox to thereby avoid heat damage to said collection chamber when the cooking chamber is in use.

13. The grill assembly of claim 12 wherein said collection chamber supporting member comprises at least one groove, said frame members being arranged so that said grooves are aligned on a parallel horizontal plane.

14. The grill assembly of claim 12 wherein said collection chamber further comprising at least one heat shield.

15. The grill assembly of claim 12 wherein said frame assembly is connected to said base of said firebox.

16. The grill assembly of claim 12 wherein said frame assembly is connected to said sidewalls of said firebox.

17. The grill assembly of claim 12 further comprises a mounting assembly comprising at least two mounting members being attached to said firebox, said first mounting member being directly connected to said first frame member and said second mounting member being directly connected to said second frame member to thereby create a distance between said cooking chamber and said frame assembly to avoid heat damage to said frame assembly when the cooking chamber is in use and said mounting assembly creating a fixed special relationship between said first and second frame members without the use of a cross member.

18. The grill assembly of claim 17 wherein said mounting assembly comprises at least four mounting members, each of said frame members having opposing ends, at least one of said mounting members being attached to each one of said opposing ends of said frame members.

19. The grill assembly of claim 12 wherein said collection chamber supporting member comprises at least one slot for securing said collection chamber to said frame members.

20. A portable barbecue grill assembly comprising:
a grill body comprising at least one cooking chamber having at least one lower firebox, said firebox comprising a continuous base, at least two sidewall and an open top;
a grill located in said firebox and a lid pivotally mounted to said grill body and designed to cover said open top of said firebox;
a frame supporting assembly comprising first and second frame members;
at least one shelf being directly and pivotally attached to said frame supporting assembly, at least a portion of said shelf being foldable into said cooking chamber during a stowage position and extendable from said cooking chamber during said usage position and having a distance between said shelf and said cooking chamber to avoid heat damage to said shelf when the cooking chamber is in use; and
a mounting assembly being attached to said firebox, said mounting assembly being directly connected to said first frame member and said second frame member to thereby create a distance between said cooking chamber and said frame assembly to avoid heat damage to said frame assembly when the cooking chamber is in use and said mounting assembly creating a fixed special relationship between said first and second frame members without the need of a cross member between said frame members.

21. The grill assembly of claim 20 wherein said mounting assembly comprises at least two mounting members being attached to said firebox, said first mounting member being directly connected to said first frame member and said second mounting member being directly connected to said second frame member.

22. The grill assembly of claim 20 wherein said mounting assembly comprises at least four mounting members, each of said frame members having opposing ends, at least one of said mounting members being attached to each one of said opposing ends of said frame members.

23. The grill assembly of claim 20 wherein at least one of said mounting members is attached to said base of said firebox.

24. The grill assembly of claim 20 wherein at least one of said mounting members is attached to at least one sidewall of said firebox.

25. The grill assembly of claim 20 wherein each of said frame members comprises at least one leg.

* * * * *